3,394,486
FISH TANKS
Hubert Morawetz, Wolgast, Germany, assignor to VEB
Preene-Werft Wolgast, Wolgast, Germany
Filed Mar. 22, 1966, Ser. No. 536,409
5 Claims. (Cl. 43—55)

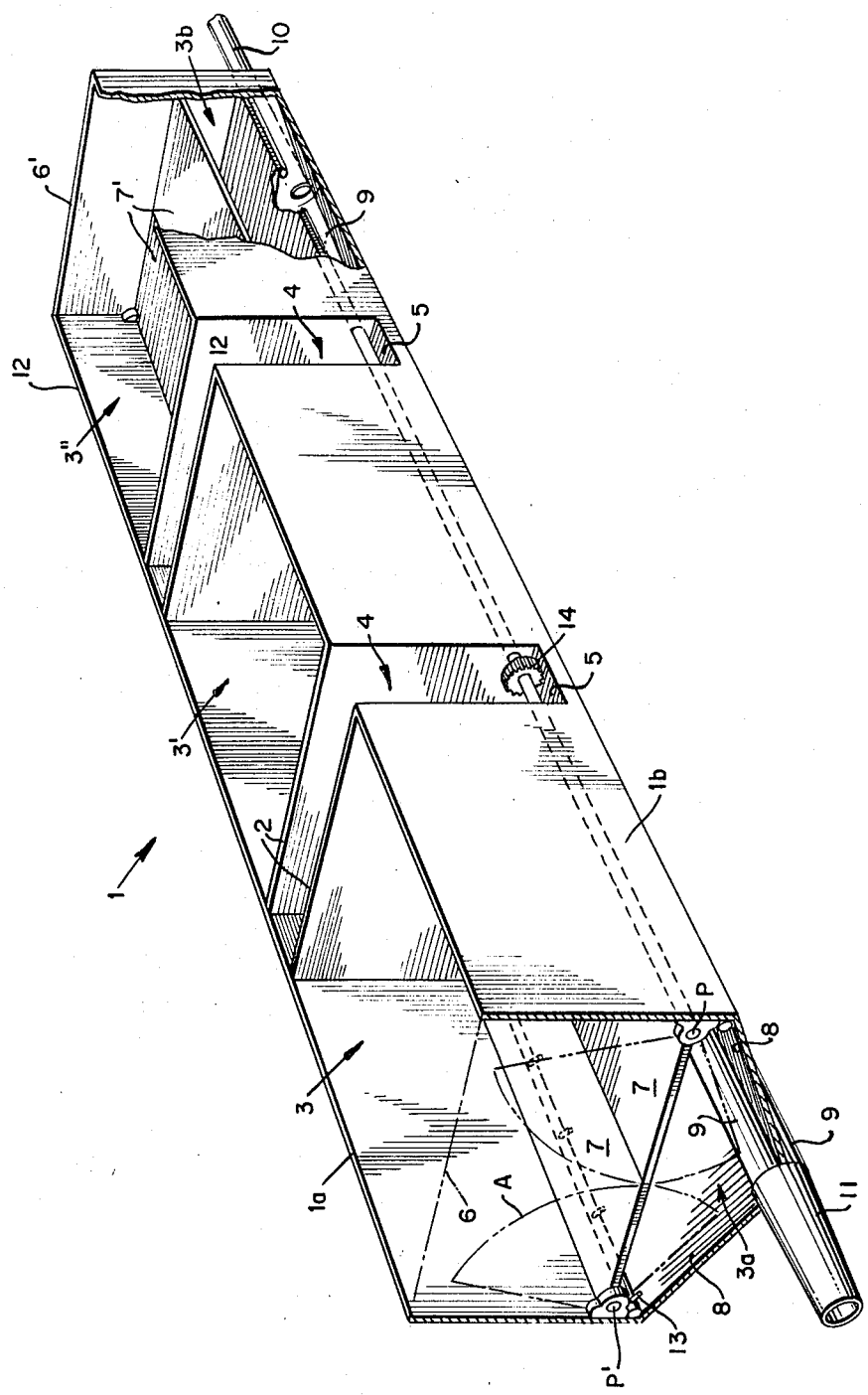

ABSTRACT OF THE DISCLOSURE

A container for storage of fish comprising at least one tank section, a pair of flexible surfaces pivotably mounted in each tank section and adapted to define a first and a second compartment therein at one position thereof, means for pivoting the flexible surfaces to a position uncovering the first compartment and returning the flexible surfaces to the first position thereof upon completion of filling of the first compartment, whereupon filling of the upper second compartment may be commenced.

---

The present invention generally relates to a fish tank, and more specifically to a fish tank which is used on fishing vessels for the storing of fish for short periods of time.

Past experience has shown that fish should be stored in tanks in such quantities as to avoid crushing and impairing their quality.

Fish tanks are known, which consist of a loading and a storage chamber. A plurality of parallel arranged yielding loading platforms are provided in the loading chamber, which platforms are pivotably mounted at one end thereof to bearing rods beneath a feed hatch, and which have end rods on their free ends, which again are pivotably connected with each other by means of stationary spacer rods. The loading platforms are lifted through the end rods by means of an elevating mechanism, such as ropes, chains, hinged rods, or the like, in such a way that they receive the catch in a substantially horizontally arranged manner.

The removal of the catch from the loading platforms into the storage space is performed by moving the loading platforms into a perpendicular position by means of the already mentioned elevating mechanism, so that the fish slide through a receiving opening into the storage chamber.

The known, above-described fish tanks comprise a plurality of loading platforms which are perpendicularly adjustable, but which are very expensive and difficult to operate.

The movably arranged loading platforms as well as the associated elevating mechanism are subject to unusual wear, due to the great stress, and also due to the rocking movement of the ship.

A further shortcoming of the known fish tanks resides in the fact that when fish are moved from the fish tank, the fish collected in the storage chamber will congest the area around the discharge opening, despite the fact that the fish tank walls are formed like funnels.

It is, therefore, an object of the invention to provide a fish tank which may be filled and emptied quickly and efficiently.

In accordance with the invention the fish tank consists of one or a plurality of tank compartments, which are separated from each other by means of vertical partitions. The vertical partitions do not reach down to the bottom of the tank, so that the lower portion of the fish tank consists of a continuous chamber running along the entire tank length. Within the individual tank compartments at least a pair of pivotable intermediary bottom plates or flaps are arranged in a predetermined distance above each other, such flaps being adapted to be held at any desired point over their pivot range. The number and the vertical spacing of these pair-wise mounted intermediate bottom plates is defined by the height of the tank, and is such that the storage height of the fish is kept within variable limits. The tank compartments may be separated from each other, in such a manner that intermediate spaces are provided between the respective adjacent partitions in the form of trunk spaces which are closed at their lower portion by bottom partitions. The trunk spaces are particularly adaptable for housing the necessary drives which pivot the intermediary bottom plates. In order to provide access to the trunk spaces, one of the two longitudinal walls of the fish tank is cut out in the neighborhood of the respective trunk spaces. The bottom of the tank consists of two bottom plates which are inclined toward each other and joined by a delivery trough. On the one end of the delivery trough, a connection is provided for a flushing conduit, while on the other end thereof, a suction connection is provided which at its adjoining end is correlated with the shape of the delivery trough. The delivery trough may be formed in various ways, for instance, as an inclined delivery trough in a straight fish tank, a straight delivery trough in an inclined fish tank, or as an inclined delivery trough in an inclined fish tank. Furthermore, rinsing nozzles are arranged over the total length of the longitudinal tank walls within the lower continuously arranged tank section, in such a way, that the jet of the rinsing water is applied directly above and parallel to the inclined tank bottoms.

For a better understanding of the invention, its operating advantages and the specific objects attained by its use, reference should be had to the descriptive matter and to the accompanying drawing in which:

The single figure is a schematic drawing showing a preferred embodiment of the invention, i.e. a fish tank consisting of three compartments.

Fish tank 1 is defined by longitudinal walls 1a and 1b and end walls 6 and 6'. Tank 1 is separated into three tank sections 3, 3' and 3'' by vertical partitions 2, so that trunk spaces 4 are formed between the respective tank sections 3. The lower portion of the trunk spaces is formed by bottom plates 5 disposed transversely with respect to partitions 2 and end wall 6. Within the individual tank sections 3, pivotable intermediate bottom plates or flaps 7 are arranged in pairs and are adapted to pivot over a defined range A and to be fixedly held at any desired point over such range. The lower portion of the tank is formed preferably by a pair of bottom plates 8 inclined toward each other and terminating in a delivery trough 9.

More than one set of pairs of flaps 7 may be arranged within an individual compartment, such as illustrated in compartment 3'', wherein an additional pair of flaps 7' is arranged at a predetermined disposition and vertically off-set from the lower pair of flaps 7. The number of flap pairs is dependent on the height of the fish tank and upon the desired manipulation of the fish vertically within the individual compartments.

The flaps are mounted for pivoting, as illustratively shown only for compartment 3, but it is understood that a similar pivoting arrangement is also employed with the remaining compartments. The flaps are joined to the respective end walls of the individual compartments, such as end wall 6 and partition 2 for compartment 3 at pivot points P and P'. The pivoting of the flaps over range A is effected by a gear shown generally at 14 which is disposed in the trunk space 4 provided between compartments 3 and 3'. It is understood that gear 14 may operate the row of flaps on its respective side and a separate gear may be provided for the opposite row of flaps. The gear may also operate an individual flap or two adjacent flaps, or a single gear may operate centrally all flaps on both sides of the tank.

The partitions 2 do not reach to the bottom of the tank 1 but terminate in their bottom plate 5, therefore, the flaps 7, particularly the lower ones if there is more than one row present, for a continuous chamber 3' in cooperation with bottom walls 8. Chamber 3a communicates the respective upper compartments 3b of the tank with delivery trough 9. The delivery trough 9 runs throughout the length of tank 1. To one end of delivery trough 9, a rinsing connection 10 is provided and on the other end thereof a suction connection 11. Suction connection 11 is formed as a blunt inclined cone, corresponding to the inclination of delivery trough 9. Rinsing nozzles 13 of which only one is shown, are arranged at selected places along the length of the longitudinal walls of the tank, directly above the joint where the longitudinal walls meet the bottom plates 8. Rinsing nozzles are so directed with respect to the adjacent bottom plate that the jet of water from nozzles 13 is directed parallel with the inclined bottom plate 8.

The fish tank in accordance with the invention operates as follows: For receiving fish, which are loaded through the openings of the compartments, the pair-wise arranged intermediary bottom plates 7 are pivoted into a vertical position in alignment with the longitudinal walls 12, by means of the mechanical drive 14. After reasonably filling the lower continuously running tank section 3a the flaps are pivoted to the position shown in the drawing for receiving further fish to be stored within upper tank section 3b.

For emptying the filled fish tank 1, water is injected through connection 10 and the water-fish mixture will be pumped off first from chamber 3a by means of a fish pump which is connected to suction connection 11, into a storage tank by means of a conduit and a transfer funnel which is arranged on one end of the conduit. When the continuous tank section 3a is empty, the intermediary bottom plates 7 will be pivoted downwardly and the fish which are stored in tank sections 3b slide into tank section 3a and into delivery trough 9.

For removing the remaining fish, water will be injected into the tank through rinsing nozzles 13 facilitating movement of the fish stock toward suction connection 11.

It is seen that a fish tank has been provided in which storage of the fish is arranged in separable compartments, which fact prevents that in the event of a fully loaded tank, the fish on the bottom being compressed by the weight of the fish above. In addition, congestion of the fish at the suction terminals is prevented by such distribution of weight into a plurality of compartments.

While the above description discloses a preferred embodiment of my invention, my invention is by no means to be limited to the embodiment shown, but rather should be defined by the range of the appended claims.

What I claim is:

1. Apparatus for storage of fish, comprising tank section means, pivotably mounted means in said tank section means and adapted to define a first and a second compartment therein at one position thereof, means for pivoting said pivotably mounted means to a position uncovering said first compartment and returning said pivotably mounted means to said one position thereof upon completion of filling of said first compartment, whereupon filling of said second compartment may be commenced, further comprising wall means for separating said second compartments of adjacent tank sections of said tank section means, said first compartments of adjacent tank sections being in open communication with each other wherein said wall means separating adjacent ones of said second compartments of said tank sections form a free space between said second compartments, said free space receiving control means therein connected with said means for pivoting whereby the pivotably mounted means may be moved to said one position in each of the tank sections.

2. Apparatus for storage of fish, comprising tank section means, pivotably mounted means in said tank section means and adapted to define a first and a second compartment therein at one position thereof, means for pivoting said pivotably mounted means to a position uncovering said first compartment and returning said pivotably mounted means to said one position thereof upon completion of filling of said first compartment, whereupon filling of said second compartment may be commenced, further comprising wall means for separating said second compartments of adjacent tank sections of said tank section means, said first compartments of adjacent tank sections being in open communication with each other wherein said first compartment of said tank sections comprises a tapered portion, means connected to said tapered portion for forming an outlet for said apparatus, wherein said pivotably mounted means comprise a pair of substantially flexible members adapted to pivot in opposite sense and for forming an intermediary bottom at said one position thereof, wherein said wall means separating adjacent ones of said second compartments of said tank sections of tank section means form a free space between said second compartments, said free space receiving control means therein connected with said means for pivoting said pivotably mounted means on said wall means of said tank sections, said control means comprising gear means.

3. Apparatus as claimed in claim 2, wherein said tapered first compartment terminates into a delivery trough, said delivery trough being connected to said outlet.

4. Apparatus as claimed in claim 3, including means connected to said delivery trough for applying a jet of water to said delivery trough.

5. Apparatus as claimed in claim 4, further comprising rinsing means mounted in each of said tank sections above said tapered first compartment for directing jets of water in a direction toward said delivery trough.

References Cited

UNITED STATES PATENTS

| | | | |
|---|---|---|---|
| 881,488 | 3/1908 | Rochow | 119—5 |
| 1,156,515 | 10/1915 | Barba | 119—5 |
| 1,845,599 | 2/1932 | Haviland | 119—5 |
| 2,513,004 | 6/1950 | Cooley | 114—0.5 |

FOREIGN PATENTS

| | | |
|---|---|---|
| 18,242 | 12/1913 | Denmark. |

HUGH R. CHAMBLEE, *Primary Examiner.*